July 28, 1953     K. MAST     2,646,712
HARMONICA

Filed April 30, 1951     4 Sheets-Sheet 1

INVENTOR:
KURT MAST
By: Young, Emery & Thompson
Attys.

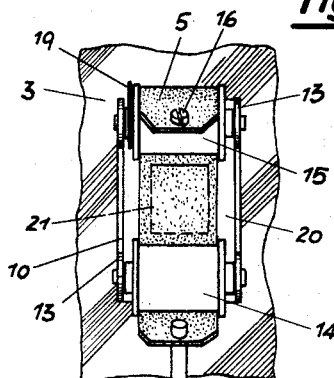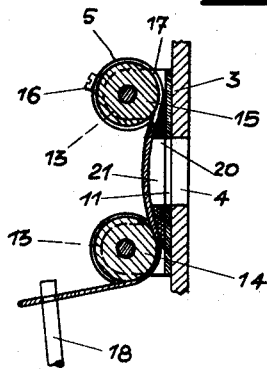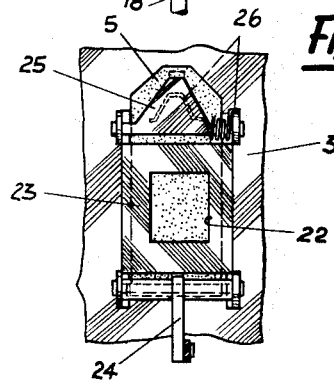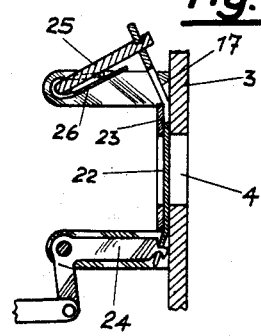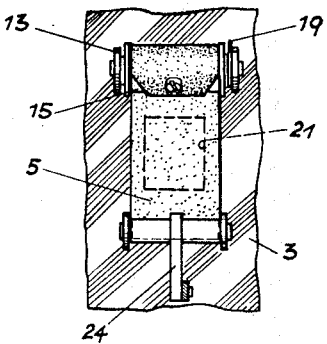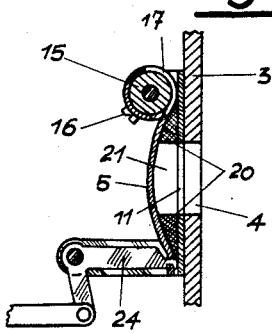

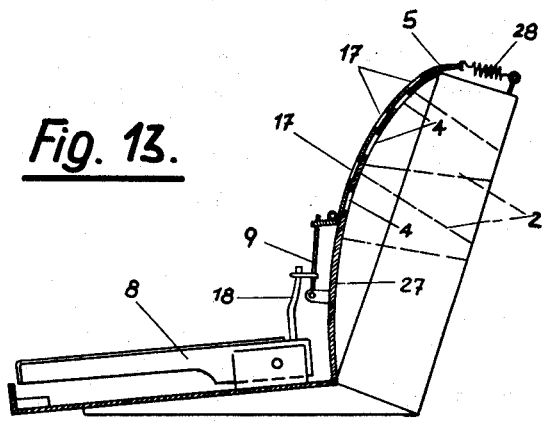
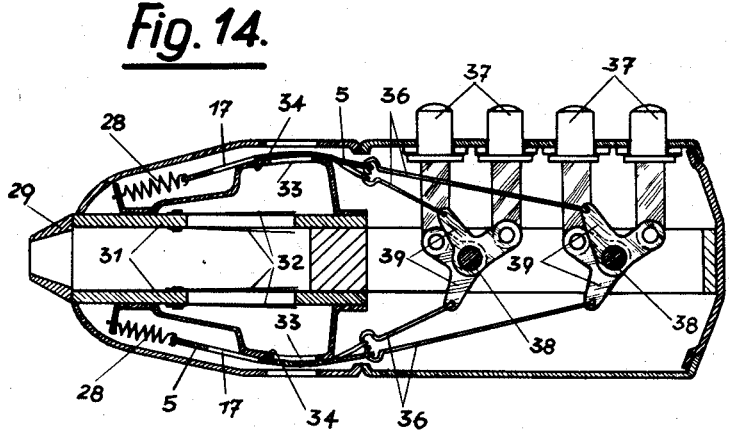
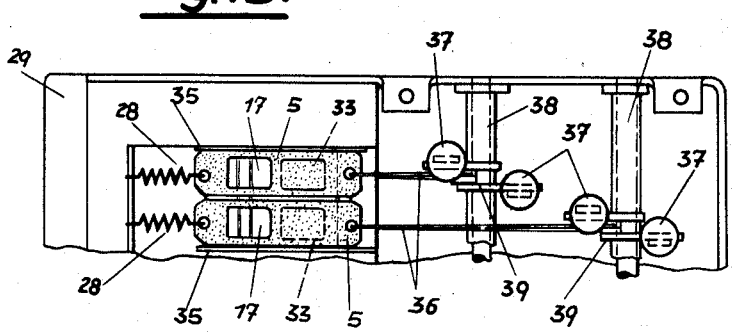

July 28, 1953 K. MAST 2,646,712
HARMONICA
Filed April 30, 1951 4 Sheets-Sheet 4
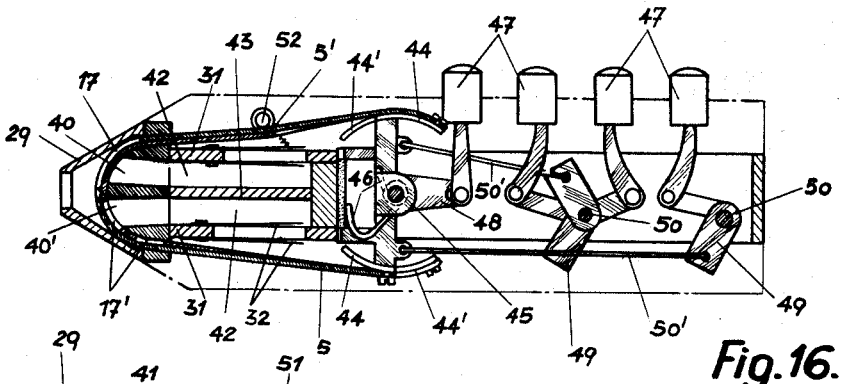
Fig. 16.
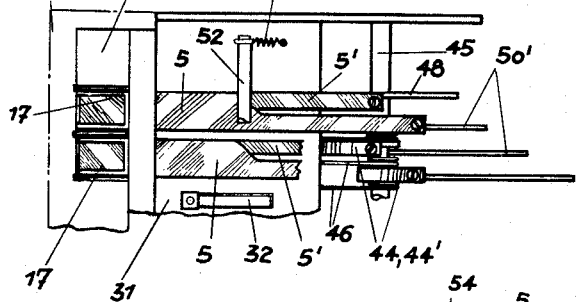
Fig. 17.
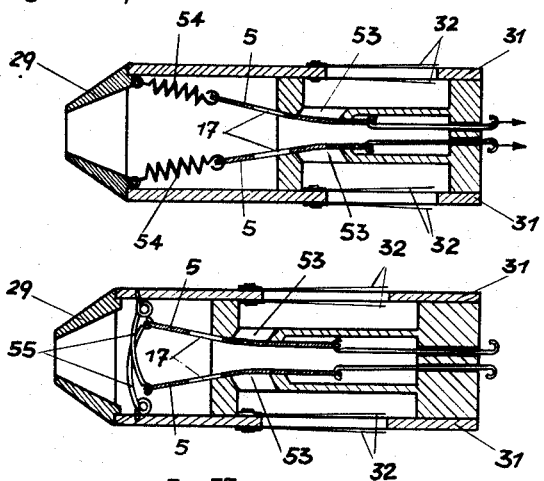
Fig. 18.
Fig. 19.
Fig. 20.
INVENTOR:
KURT MAST
By: Young, Emery & Thompson
Attys.

Patented July 28, 1953

2,646,712

UNITED STATES PATENT OFFICE 2,646,712

HARMONICA

Kurt Mast, Trossingen, Wurtemberg, Germany, assignor to Matth. Hohner A.-G., Trossingen, Wurtemberg, Germany, a joint-stock company Application April 30, 1951, Serial No. 223,680

In Germany May 6, 1950

17 Claims. (Cl. 84—377)

The invention relates to a harmonica having the shape of an accordion or of a mouth organ provided with an improved control for opening and closing the wind channels. Accordions as well as mouth organs are known in which the wind channels are controlled by means of one or a plurality of stiff slides running in a plane which slides may be tightened only with difficulty, one slide controlling simultaneously a plurality of openings of wind channels containing tones and belonging to a succession of sounds. The present invention differs from the known construction thereby that the wind channels are controlled by flexible bands movable not only in a plane in the direction of the pull of a spring. In their initial position these bands close the openings of associated wind channels if the bands are displaced contrary to the pull of the spring the wind channels are cleared and the bands after having been actuated return into their closing position in consequence of the pull of the spring.

Up to now rocking flaps are known for individually controlling wind channels. These flaps have the disadvantage that they cause noises if actuated, furthermore that special attention must be paid to the tightening (the flaps must therefore be provided with special noise suppressing material and leather), and that the air put into sound vibrations flows against the surface of the flap. The disadvantages of the known slides as well as the flaps are removed by the present invention.

The flexible bands control the openings of the wind channels either by means of one or a plurality of openings or holes provided therein or with their edge. They are guided over a plane or a convex surface in which the wind channel openings are provided by means of rollers, levers, or other suitable pulling means, such as wires or the like. Wind channel openings arranged one behind the other in the moving direction may also be controlled by two bands moving in opposite directions. The bands may be operated in a manner known per se by means of keys or buttons.

It is an advantage of the invention that in a continuous succession of sounds running from deep to high notes the openings of the wind channels associated to the respective notes and being of different size may be provided individually with such band controls which may easily be adapted to differently large openings.

In the drawings the subject matter of the invention is illustrated by some embodiment shown by way of example.

Figs. 1–13 show the use of the invention in connection with an accordion,

Fig. 1 being a side view of the general arrangement of the bands in an accordion;

Fig. 7 is a plan view of a band guide along a convex surface by means of rollers;

Fig. 8 is a section through Fig. 7;

Fig. 9 is a plan view of a band guide along an even surface by means of levers;

Fig. 10 is a section through Fig. 9;

Fig. 11 is a plan view of a band guide along a convex surface by means of a lever and a roller;

Fig. 12 is a vertical section through Fig. 11.

Fig. 13 shows a band guide along a convex surface with wind channel openings arranged the one behind the other in the moving direction, partially in a section.

Figs. 14–20 show the employment of the invention in connection with a mouth organ.

Fig. 14 being a section through a mouth organ in which flexible bands are guided over convex surfaces provided with wind tube openings;

Fig. 15 is a plan view of Fig. 14 the casing being removed;

Fig. 16 shows a section illustrating the use of the flexible band in a mouth organ in which the bands are arranged in pairs and moving in opposite directions;

Fig. 17 is a plan view, the casing being removed,

Figs. 18 and 19 are sections through two other embodiments of mouth organs;

Fig. 20 is a section through an embodiment in which the bands are not provided with one or a plurality of openings but control with their edges.

Figure 2:
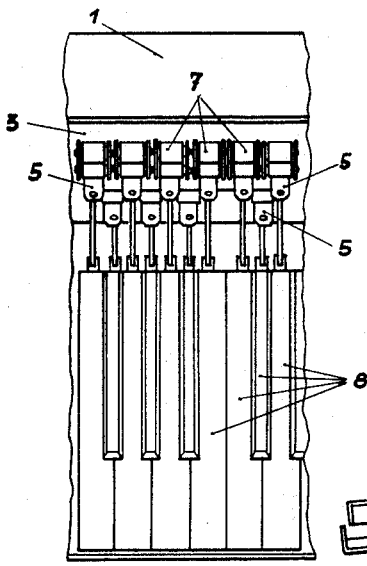
Fig. 2 is a plan view of a portion of such accordion.
Figure 1:
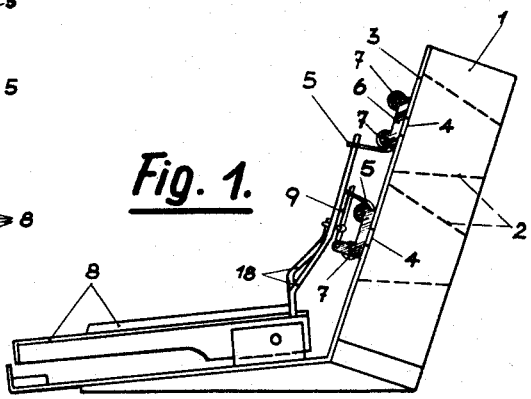
Figure 4:
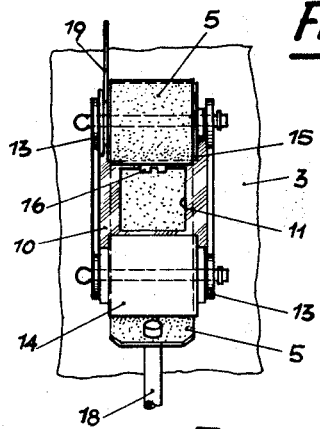
Fig. 4 is a plan view thereof.
Figure 3:
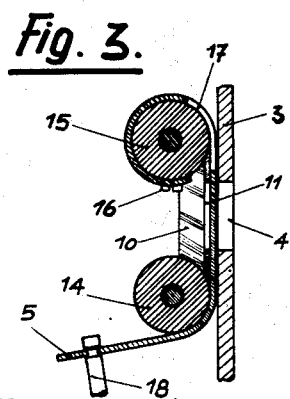
Fig. 3 is a section through the guide of a band along an even surface by means of rollers.

The general arrangement used with accordions is shown in Figs. 1 and 2. In the casing 1 of the accordion sound posts 2 are provided and in the wall 3 covering these sound posts wind channel openings 4 are provided each of which being covered by a flexible band 5 movable in its longitudinal direction and provided with an opening which may be aligned with the associated wind channel opening 4 by moving the band in its longitudinal direction.

The bands 5 are guided by a frame 6 arranged above the wind channel opening and by rollers 7 and are under the action of a spring tending to pull the band into the closing position. This spring is not shown in Figs. 1 and 2 which only illustrate the general arrangement. The bands are moved in their longitudinal direction by the actuation of buttons or keys 8 acting on the one end of each band 5 by means of a leverage 9.

Figure 5:
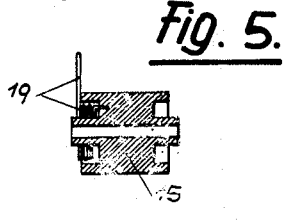
Figs. 5 and 6 are details.
Figure 6:
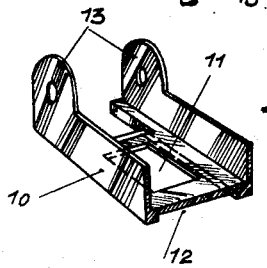

The embodiment according to Figs. 3–6 shows the wall 3 covering the sound posts 2 provided with a wind channel opening 4. This opening is covered by the band 5 kept in intimate contact with the wall by means of a frame 10 fastened at the wall 3. This frame is shown in detail in Fig. 6. It is provided with an opening 11 corresponding to the wind channel opening 4, and at its lower surface with a recess 12 by which the band 5 is guided. At the ends of the frame 10, the one of which being cut away in Fig. 6, eyes 13 are provided for supporting the rollers 14 and 15. At the circumference of the roller 15 the band 5 is fastened e. g. by means of a small screw 16. The band is provided with an opening 17 adapted to be aligned with the wind channel opening 4 and the opening 11 of the frame 10 if the band 5 is unwound from the roller 15 e. g. by actuating the lever 18. In order to bring the band 5 into its closing position a torsion spring 19 is provided at the roller 15 counteracting to the actuation of the lever 18 (Fig. 5).

The embodiment according to Figs. 3–6 may be modified in such a way that a guiding element 20 having a convex surface is inserted between the band 5 and the frame 10, the band 5 being guided between the rollers 14 and 15 over the said element which is also provided with an opening 21 (Figs. 7 and 8), corresponding to the openings 4 and 11. In consequence of the convex surface the band 5 is better tightened relatively to its support.

Figs. 9 and 10 show an embodiment in which levers 24, 25 are supported by a frame 23 provided with an opening 22 corresponding to the wind channel opening 4 and fastened at the wall 3, the ends of the band 5 which is also provided with a corresponding opening 17 being fastened on said levers. The lever 25 is under the action of a torsion spring 26 tending to pull the band into the closing position contrary to the movement of the lever 24 if actuated. The lever 25 has nearly a trapezoid shape.

Figs. 11 and 12 show a combination of the embodiments according to Figs. 7 and 10. The one end of the band 5 guided over the convex surface 20 is fastened at the circumference of the roller 15 being under the action of a torsion spring 19 while the other end of the band is fastened to a lever 24.

In the embodiment according to Fig. 13 a convex surface 27 covering the sound post 2 is provided having wind channel openings 4 arranged the one behind the other in the moving direction of the band and associated to different sound posts 2. The flexible band 5 which is provided with a corresponding number of openings 17 runs over these wind channel openings 4 on the convex surface 27. The one end of the band 5 is connected with a draw spring 28 fastened at the casing 1 of the accordion and the other end is fastened to a lever 18 adapted to be actuated by a key 8 over a transmission lever 9.

Figs. 14 and 15 show the use of the invention in combination with a mouth organ. The mouth piece 29 of this organ is provided with a blowing opening through which air enters a chamber 30, the two longitudinal walls of which being formed by the sound plates 31 carrying the reeds. For each reed 32 or for each pair of reeds a band 5 with openings 17 is provided controlling the respective air openings 33. The bands 5 are supported by convex surfaces 34 extending over the entire length of the mouth organ and provided with lateral guides 35 for the bands 5. The one end of the bands 5 is fastened at pulling springs 28' while the other end is attached to rod-like members 36 connected with bell crank levers 39 pivotally supported by axes 38 and actuated by buttons 37.

Figs. 16 and 17 show a mouth organ in which, contrary to the embodiment according to Figs. 14 and 15, the air is controlled before contacting the reeds 32. Here below the mouth piece 29 provided with a blowing opening a convex surface 41 (Fig. 17) provided with openings 40, 40' is arranged. These openings which are positioned the one behind the other in the moving direction of the band open each into a wind channel 42 the one side wall of which being formed by a sound plate 31 while the other side wall forms a common intermediate wall 43.

On the convex surface 41 two flexible bands 5 and 5' run in opposite directions each of which being provided with an opening 17 or 17' respectively of such a length that it may be aligned simultaneously with both openings 40 and 40' of the convex surface 41. Of course, the openings 17 and 17' may also be subdivided to form two separate openings by a cross piece having the size of the intermediate wall 43. Besides, the openings 17, 17' of the band 5 or 5' respectively are arranged to align in their position of rest each with only one of the two openings 40 or 40' and extend from the intermediate wall 43 beyond the openings 40 and 40' so that in the closing position no connection exists between the mouth piece 29 and the wind channels 42.

The ends of each band 5 or 5' respectively are fastened to segments 44 or 44' respectively arranged diametrically, said segments being rotatably supported by an axis 45 common to all segments and are under the action of a torsion spring 46 tending to return them into the position of rest of the band fastened thereon. The segments 44, 44' may be rocked around their axis 45 by buttons 47. Corresponding to the arrangement of these buttons 47 they act either directly on to the segments over levers 48 or they are arranged suchwise that they act each on a bell crank lever 49 connected with the two associated segments by a rod 50'. The bell crank levers 49 are supported by separate axes 50. For the purpose of keeping the bands 5, 5' continuously under tension it is suitable to provide a small roller 52 pressing on them under the action of a spring 51.

In the embodiment illustrated in the drawings the opening 40' which is cleared by the band 5' in the position of rest is also cleared by the outer band 5 if the latter is moved in its longitudinal direction contrary to the action of the associated torsion spring 46. When actuating the inner band 5' contrary to the action of the associated torsion spring 46 the opening 40 is cleared by that band which opening was already cleared by the outer band 5. If both bands 5 and 5' are actuated simultaneously both openings 40 and 40' are cleared.

Figs. 18 and 19 show further embodiments in which the air is controlled before meeting the reeds 32. However, in these embodiments instead of the bands running in opposite directions simple bands 5 are used provided each with an opening 17 adapted to be aligned with the wind channel opening 53. The bands 5 are displaced in their longitudinal direction by a lever system not shown in the drawings. In the embodiment according to Fig. 18 the bands are displaced contrary to the action of tension springs 54 to which the one end of the bands is fastened, and in the embodiment according to Fig. 19 torsion springs or small leaf springs 55 engaging the ends of the bands 5 are provided for the mentioned purpose.

Fig. 20 shows an embodiment in which the bands 5 are without openings and control the air passages with their edges 56. The end of each band 5 covers one of the wind channels 57 arranged in two series side by side. The edges 56 of the bands abut against an intermediate wall 58 separating the two series of wind channels 57 and are covered in this position by a ledge 59. Near their edges 56 the bands 5 are engaged each by a torsion spring 55' or a small leaf spring. The other ends of the bands are connected with a lever system not shown in the drawings. If a band is actuated contrary to the action of the spring 55' the controlling edge 56 leaves its end position and clears the respective wind channel 57. After the actuation the band 5 moves under the action of the spring 55' so as to cover the associated wind channel and its controlling edge enters again the gap between the ledge 59 or the like and the intermediate wall 58.

Also in the embodiments according to Figs. 18–20 the bands 5 are guided over convex surfaces.

Having thus particularly described the nature of my said invention and the manner in which the same is to be performed what I wish to have covered by Letters Patent is:

1. A harmonica comprising a casing provided with openings adapted to operate as channels for the wind, movable flexible controlling bands, each band mounted to close and to clear at least one wind channel and to be moved over a curved surface, means connected to each band and adapted to be selectively operated and to move the respective band thereby clearing the respective wind channel, and spring means connected to the casing and to each band and operative counter to said first-mentioned means to return the respective band into the initial closed position relative to the wind channel.

2. A harmonica comprising a casing provided with openings adapted to operate as channels for the wind, movable flexible controlling bands each with an opening therein, each band mounted to close and to clear at least one wind channel and to be moved over a curved surface, means connected to each band and adapted to be selectively operated and to move the respective band thereby clearing the respective wind channel, and spring means connected to the casing and to each band and operative counter to said first-mentioned means and adapted to return the respective band into the initial closed position.

3. A harmonica comprising a casing provided with openings adapted to operate as wind channels, movable flexible controlling bands each adapted to close and to clear its respective wind channel and to be moved in a curved path, each band having an opening therein, guide means arranged at opposite sides of the wind channels to guide said bands, means connected to each band to be selectively operated and to move the respective band thereby aligning said openings and the respective wind channel and clearing the latter, and spring means counteracting to the said last mentioned means connected to the casing and to each band and operative to return said bands into the initial closing position.

4. A harmonica according to claim 3, in which the guide means comprises rollers arranged at opposite sides of the wind channels.

5. A harmonica as claimed in claim 3, said guide means comprising guide frames arranged before the said wind channels and adapted to guide said bands in intimate contact with the wind channels.

6. A harmonica as claimed in claim 3, said guide means comprising curved surfaces arranged before the said wind channels, provided with openings aligning with the openings of the wind channels and adapted to guide the said bands in the curved path.

7. A harmonica as claimed in claim 3, said guide means comprising a guide frame arranged before one of the said wind channels, a curved surface attached to said frame and provided with an opening aligning with the opening of the respective wind channel, said frame and curved surface being adapted to guide the said band in the curved path.

8. A harmonica comprising, in combination with the sound posts; a common intermediate wall covering the said sound posts and having a convex curvature and wind channels therein, moving flexible controlling bands adapted to close and to clear said wind channel openings and to be moved over said convex curvature, means adapted to move said bands thereby clearing the respective wind channels and spring means counteracting said first mentioned means and adapted to return said bands into the initial closing position.

9. A harmonica as claimed in claim 8, the said wind channel openings being arranged in a plurality of series lying in the moving direction of said bands.

10. A mouth organ, comprising, in combination, a casing having wind channels therein, movable flexible controlling bands adapted to close and to clear said wind channels and to be moved in a curved path, means adapted to move said bands thereby clearing the respective wind channels and spring means counteracting said first mentioned means and adapted to return said bands into the initial closing position, the openings of said wind channels being arranged in a plurality of series lying in the moving direction of said bands, and one controlling band being provided for each of said wind channel openings.

11. A mouth organ, comprising, in combination, a casing having wind channels, movable flexible controlling bands adapted to close and to clear said wind channels and to be moved in a curved path, means adapted to move said bands thereby clearing the respective wind channels and spring means counteracting said first mentioned means and adapted to return said bands into the initial closing position, the openings of said wind channels being arranged in a plurality of series lying in the moving direction of said bands, the wind channel openings lying the one behind the other in the moving direction of the bands being associated with two controlling bands moving in opposite directions.

12. A mouth organ as claimed in claim 10, the means for moving the bands comprising pairs of oppositely located rotatable segments, the two segments of each pair having attached to them the opposite ends of one of said bands and said spring means consisting of torsion springs tending to rotate one segment of each pair for closing the respective wind channel opening.

13. A mouth organ comprising, in combination, a casing provided with wind channels, movable flexible controlling bands adapted to close and to clear said wind channels and to be moved in a curved path, means adapted to move said bands thereby clearing the respective wind channels and leaf springs each of which being operatively connected with the one end of a band and arranged about rectangularly thereto, counteracting to said means and adapted to return said bands into the initial closing position.

14. A mouth organ as claimed in claim 13, said bands being adapted to control said wind channels by means of their edges.

15. A harmonica as claimed in claim 2, said means for moving the bands for clearing the wind channels comprising keys and levers connecting said keys with the bands.

16. A harmonica as claimed in claim 2, said means for moving the bands for clearing the wind channels comprising buttons and levers connecting said buttons with the bands.

17. A harmonica as claimed in claim 1, the size of the openings in said band being adapted to the corresponding openings of the wind channels.

KURT MAST.

References Cited in the file of this patent

UNITED STATES PATENTS

| Number | Name | Date |
|---|---|---|
| 176,124 | St. John | Apr. 11, 1876 |
| 1,995,751 | Sampietro | Mar. 26, 1935 |
| 2,197,773 | Rosenfield | Apr. 23, 1940 |
| 2,200,430 | Pullen | May 14, 1940 |
| 2,274,376 | Montenare | Feb. 24, 1942 |